United States Patent [19]

Yamagishi

[11] 4,390,595
[45] * Jun. 28, 1983

[54] ENVIRONMENTALLY PROTECTED IR WINDOWS

[75] Inventor: Frederick G. Yamagishi, Newbury Park, Calif.

[73] Assignee: Hughes Aircraft Company, El Segundo, Calif.

[*] Notice: The portion of the term of this patent subsequent to May 26, 1998, has been disclaimed.

[21] Appl. No.: 88,269

[22] Filed: Oct. 25, 1979

[51] Int. Cl.³ .......................... B05D 3/06; G02B 1/10
[52] U.S. Cl. .................................... 428/446; 204/170; 350/1.6; 350/1.7; 427/38; 427/41; 427/160; 428/448; 428/457; 428/689

[58] Field of Search .......................... 427/38, 41, 160; 204/170; 428/446, 448, 457, 689; 350/1.6, 1.7

[56] References Cited

U.S. PATENT DOCUMENTS 4,269,896  5/1981  Yamagishi .......................... 428/411

Primary Examiner—James R. Hoffman
Attorney, Agent, or Firm—W. J. Bethurum

[57] ABSTRACT

Transparent IR materials having a plasma polymerized saturated hydrocarbon coating exhibit excellent transmissive characteristics in the IR and exhibit excellent moisture, oxidative corrosion, and abrasion resistance.

23 Claims, 4 Drawing Figures

ENVIRONMENTALLY PROTECTED IR WINDOWS

TECHNICAL FIELD

This invention relates generally to the preparation of protective coatings for optical components and more particularly to the provision of a plasma polymerized alkane coating for germanium and zinc sulfide windows used in infrared detection systems.

CROSS-REFERENCE TO RELATED APPLICATIONS

U.S. application Ser. No. 071,605 filed Aug. 31, 1979, by applicant herein, now issued as U.S. Pat. No. 4,269,896, discloses and claims surface passivated alkali halide infrared windows and the process for fabricating the same. The process and materials used to provide coatings for the alkali halide crystals of application Ser. No. 071,605 are similar to that utilized to coat the germanium and zinc sulfide windows of the instant application. However, the resulting effects produced by the present process are significantly different.

Hughes Aircraft Company is the common assignee of the related application and the instant application.

BACKGROUND ART

Certain infrared (IR) detection systems are comprised of numerous optical components designed to reflect and transmit light in an 8 to 12 micrometer wavelength ($\mu$m) range. When these systems are mounted in various vehicles for military and space applications, they must be provided with optical transmission through their enclosures and therefore require protective housings which also transmit light in the 8 to 12 $\mu$m range. These systems and their housings are frequently required to operate at temperatures which range from a $-65°$ to $165°$ F. in rain, sleet, snow, wind, dust and sand. Protection of these systems becomes even more important if they are used in high-speed aircraft where the detrimental effects of these environmental conditions are magnified. These conditions produce abrasion and corrosion and will degrade the performance of the optical window by erosion and by a chemical oxidation process. This erosion and oxidation reduces ultimately the usable lifetime of the window.

In the past, forward looking IR (FLIR) detection systems have been mounted in enclosures having IR windows fabricated from germanium, zinc sulfide, and zinc selenide. Germanium is frequently preferred because of its transmissive characteristics, physical characteristics and relatively low processing cost. However, the world supply of germanium is limited and therefore windows of this material must possess an extended lifetime in severe environments.

Germanium IR windows and other optical components such as the silver mirrors are attacked by the environmental conditions in which FLIR systems operate. These environmental conditions cause the transmissive character of the optical elements to deteriorate and necessitates a periodic replacement schedule which, depending upon the use, may be as often as every month. As a consequence of this replacement and maintenance necessity, the reliability of the system is decreased and the cost of these systems is measurably increased.

Zinc sulfide is the material of choice for windows used as outer elements in IR seeker systems employed on high-speed aircraft. These windows deteriorate by erosion caused by dust, sand, and rain which impinge upon, and ultimately abrade, the surface of such windows. This phenomenon results in decreased lifetimes of the windows and increased maintenance costs.

Various attempts to protect IR windows from the deleterious effects of the environments in which they are exposed have been unsuccessful. Coatings applied to IR window materials either tend to preclude IR transmission or fail to protect the crystals which form such material. The most relevant prior art known to me would appear to be an article entitled "IR Laser Window Coatings by Plasma Polymerized Hydrocarbons" by J. M. Tibbitt et al., that was published in the Proceedings of the Fifth Conference on IR Laser Windows Materials, Las Vegas, Nev., Dec. 1–4, 1975. Plasma polymerized ethane (PPE) coatings applied to sodium chloride crystals were reported in this article to reduce the sensitivity of these crystals to moisture. However, sodium chloride crystals having PPE coatings prepared by me in accordance with the teachings of the above Tibbitt et al. article began to degrade because of moisture uptake within a relatively short period of time and exhibited altered IR transmissive spectra.

There are no coatings for germanium and zinc sulfide crystals known to me which are transmissive in the 8 to 12 $\mu$m region of the light spectrum and which adequately protect against water vapor and/or condensates, corrosion and abrasion when exposed to these conditions and phenomenon for relatively long periods of time.

SUMMARY OF THE INVENTION

The general purpose of this invention is to provide environmentally protected infrared components for IR detection systems.

To accomplish this purpose, I have invented an environmentally protected optical element for use in infrared detection systems comprising a transparent substrate having polished optical surfaces that are coated with a plasma polymerized saturated short chain hydrocarbon which increases transmission of light in the 8 to 12 $\mu$m region while providing protection against corrosion and abrasion of the optical element.

Germanium and zinc sulfide windows coated in accordance with my invention exhibit improved transmission in the 8 to 12 $\mu$m range and resist corrosion in a 97–100% relative humidity (RH), environment at 120° F. indefinitely.

It is therefore an objective of this invention to provide an improved environmental coating for optical components of infrared detection systems.

A further objective of this invention is to provide protective coatings for polycrystalline germanium useful as a material for optical components in infrared detection systems.

A still further objective of this invention is to provide protective coatings for zinc sulfide used as optical components in infrared detection systems.

A still further objective of this invention is to provide protective coatings for germanium which protect it from corrosion.

A still further objective of this invention is to provide a protective coating for a germanium optical element which protects the optical element from damage due to impingement of solid particles found in the environment in which said element is utilized.

A still further objective of this invention is to provide a protective coating for a zinc sulfide optical element which protects the optical element from damage due to impingement of solid particles found in the environment in which said element is utilized.

These and other objectives and features of this invention will better be understood and appreciated from the following detailed description of this invention and the accompanying drawings.

DETAILED DESCRIPTION OF THE INVENTION

I have discovered that plasma polymerized saturated short chain hydrocarbon coatings provide exceptional protection for optical elements, utilized in the fabrication of FLIR detection systems, while enhancing their transmissive characteristics in the 8 to 12 $\mu$m range.

While it is generally known that prior art anti-reflective coatings do not adequately protect the substrates to which they are applied, I have discovered that PPE films or coatings increase the transmission of germanium and zinc sulfide in the 8 to 12 $\mu$m region and, at the same time, protect against corrosion and abrasion.

Figure 1:
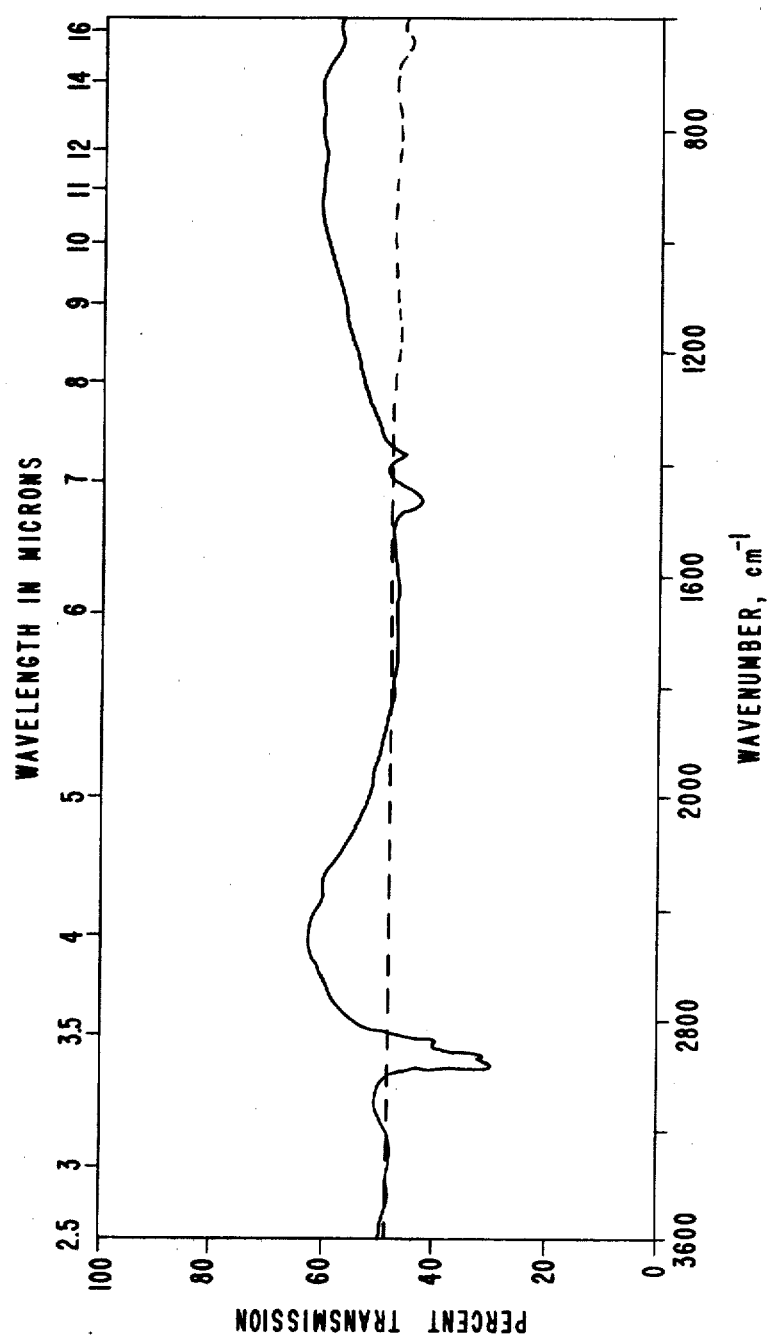
FIG. 1 is a light transmissive spectrum of PPE coated and uncoated germanium.

An example of the anti-reflection character of a 2 $\mu$m PPE film applied to germanium is shown in the light transmission spectrum presented in FIG. 1. In this instance, a percent transmission increase of as much as 27% over uncoated germanium in the 8 to 12 $\mu$m region was obtained. However, should increased corrosion or abrasion protection be desired, the film thickness may be increased by odd multiples of the quarter wave to obtain an optimum product. Similarly, PPE will act as an anti-reflective coating on zinc sulfide if the appropriate film thickness is used.

Infrared windows fabricated from transparent germanium metal crystals coated in accordance with my invention have shown no signs of degradation after exposure to a 97-100% RH (120° F.) environment for more than 11 months (testing was arbitrarily terminated). The transmissive characteristics of these windows are superior to those of uncoated germanium which require replacement within one month under similar conditions.

In fabricating windows for use in the 8 to 12 $\mu$m range, I prefer to utilize ethane as the monomeric source for my coatings. However, other saturated short chain alkane monomers such as methane, propane, butane, and pentane are also useful.

Unlike other prior art coatings, plasma polymerized ethane (PPE) forms a protective barrier about the uncoated substrate which prevents corrosion and at the same time exhibits anti-reflection properties.

Polycrystalline germanium, unlike the alkali halide crystals of my copending application Ser. No. 071,605 which dissolve in a moisture rich environment, undergoes a detrimental chemical reaction when exposed to oxygen in a moisture rich environment. The coatings of this invention are believed to prevent the oxidative reaction from occurring by eliminating moisture as a catalyst. The extent of the protection afforded by the thin films of this invention is astounding in view of their thicknesses which range from 2 to 8 $\mu$m.

Figure 2:
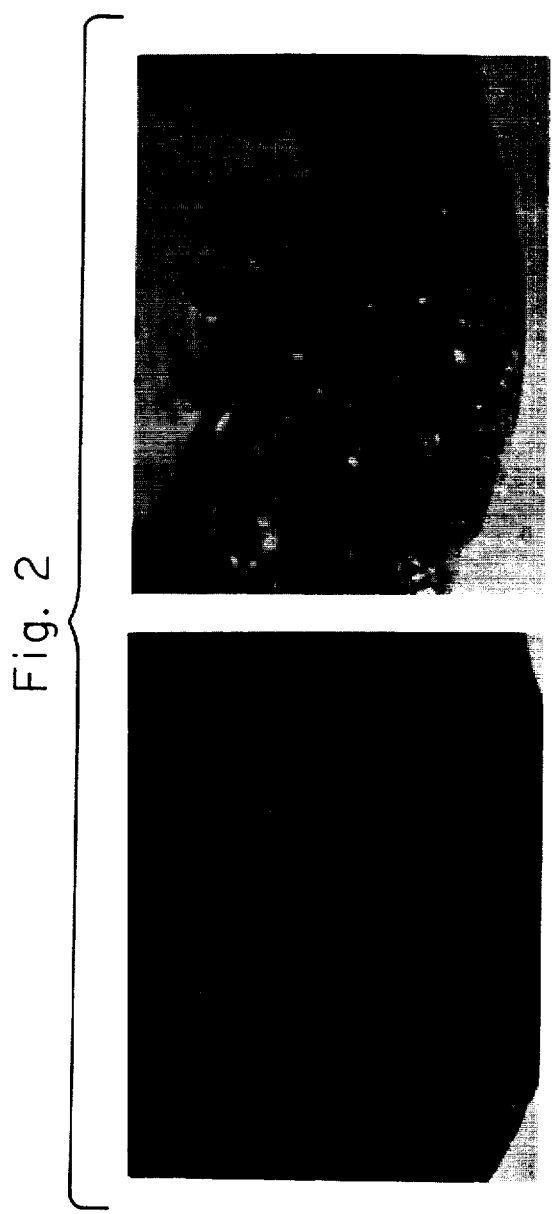
FIG. 2 is a copy of a color photograph taken of a germanium crystal having a PPE coated surface and an uncoated surface.

Referring to FIG. 2, oxidation and pitting of the uncoated surface of germanium stored in a 97-100% RH environment at 120° F. for eleven months is evident from the light blotches and spots seen in the plate on the right. However, the coated surface of the same material showed essentially no change over the same storage period. There is evidence (several small spots) of the formation of small bubbles beneath the surface of the film on the coated side (left plate of FIG. 2) of the germanium. However, the overall quality of the window remained good.

Figure 3:
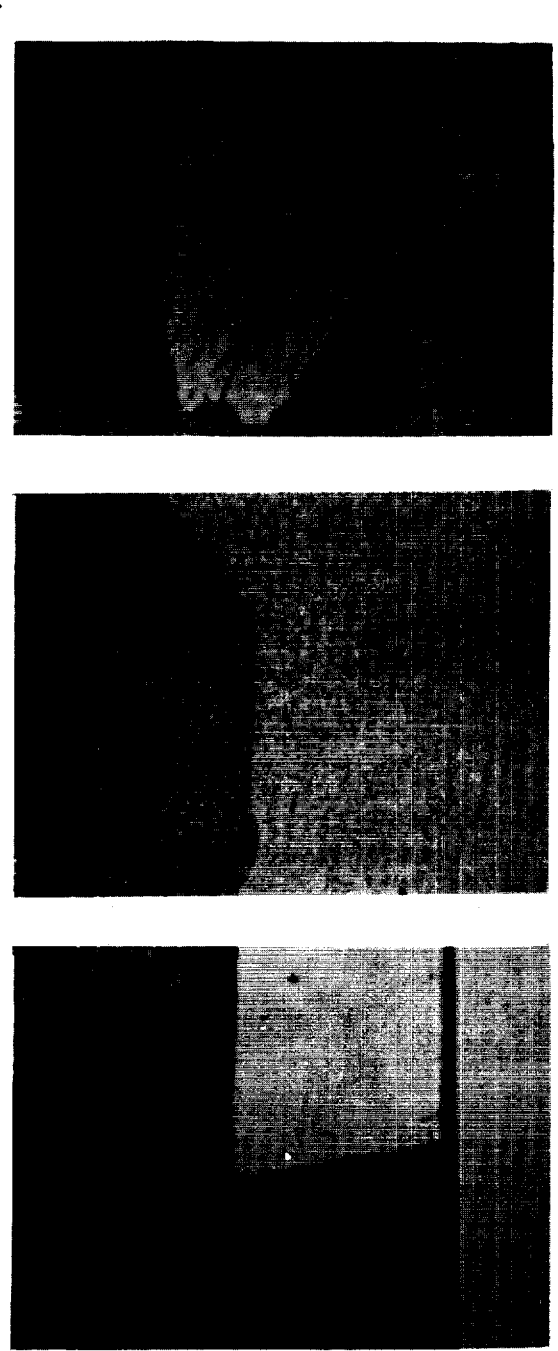
FIG. 3 is a copy of photographs taken of a zinc sulfide window having a partial coating of PPE after sandblast testing.

Plasma polymerized short chain hydrocarbon films and coatings have been applied to other materials used as optical elements in IR detection systems with excellent results. For example ZnS samples coated with PPE are substantially more abrasion resistant than uncoated ZnS. FIG. 3 illustrates the abrasion resistance of PPE to fine-grain sandblasting. A zinc sulfide crystal having PPE coated and uncoated surfaces was exposed to fine-grain sandblasting for one minute and subsequently photographed with an optical microscope at 26X. The plate on the left shows severe pitting of the uncoated surface in the upper half and left quarter portion of the plate. The lower right quarter portion of the plate is a shot of the uncoated crystal surface that was protected by the metal tool used to hold the sample. The top half of the plate in the center similarly shows pitting of the uncoated crystal surface while the lower half of the center plate shows the protection afforded by the PPE coating to the surface of the crystal.

It is clear, upon examination of the center plate, and upon comparing the protected portion of the crystal with the unprotected portions, that the PPE film provides excellent protection of the crystal surface. The plate at the right show a portion of the protected crystal surface after the sandblasted PPE film was removed. The black striations in the surface of the crystal in the plate on the right were caused by scraping of the surface with a metal blade to remove strongly adherent PPE film in order to examine the surface protected by the film.

Similarly one would expect silver mirrors coated with a thin film of plasma polymerized hydrocarbon to resist corrosion for indefinite time periods. Plasma polymerized films may be applied to ZnSe and Si substrates as well.

The infrared transmitting protective films presented in this invention were prepared by a process called plasma polymerization. This term generally describes the use of several types of electric discharge configurations in which molecules (from gaseous monomers) are subjected to energetic electrons in the discharge or plasma. This results in the formation of intermediate free radicals, ions, and other high energy species derived from the monomer. Interaction of these species to form plasma polymerized films is not completely understood. However, it is generally believed that the initial step is the absorption of the monomer on the substrate surface. This monomer layer is then bombarded by reactive plasma species as well as being acted upon by photochemical energy produced in the plasma. There is little discrimination shown in the position of formation for the free radicals. The net result of the propagating step is both a continuing growth of the polymer chains and a developing matrix of crosslink sites.

Following termination of the plasma there are long-lived residual free radicals trapped in the bulk and on the surface of the film. These radicals can react with atmospheric oxygen and must be quenched before the film is exposed to air so that polar oxygen containing groups, which would be absorbing in the infrared, are not formed. An ethylene gas purge is effective for this purpose. Other unsaturated alkene gases would also be effective for this purpose.

Polymers prepared via this method can vary in structure and molecular weight depending upon the reaction conditions. The polymer can be prepared as an oil, powder or film. In order to obtain uniform films the reaction parameters of monomer flow rate, reaction pressure, discharge power, substrate surface preparation, and reactor configuration need to be optimized for each monomer. Thus, uniform, highly crosslinked films may be conveniently prepared. For a given set of reaction conditions the deposition rate is constant and any desired thickness can be obtained by operating for a predetermined time.

The PPE film used in this invention was prepared in a capacitively coupled RF discharge at 13.56 MHz in a Pyrex tubular flow reactor using 2 inch by 3 inch parallel plate copper electrodes separated by 1¼ inch. Other reactor configuration can be use also. The sample, in this case polished polycrystalline germanium or zinc sulfide, was placed on the bottom electrode and the system was evacuated to 0.05-0.01 Torr. Ethane was bled into the system and the pumping speed was adjusted by a valve so that the pressure in the system was steady at the desired value. The plasma was initiated and the power output of the RF generator was simultaneously matched to the plasma load via an impedance matching network. After a film of desired thickness was obtained the discharge was terminated, the flow of monomer was discontinued and the reactor evacuated. Residual free radicals were quenched with ethylene prior to exposing the window to the air. Deposition rates were determined by depositing the film on glass cover slides and measuring the thickness on a Dektak FLM, Sloan Technology Corp., Santa Barbara, Calif.

Specific examples of this invention and its testing are provided below:

EXAMPLE I

Plasma polymerized ethane was deposited on a polished piece (1" diam. ×2 mm thick) of polycrystalline germanium under the following conditions: Initial pressure=0.02 Torr, flow rate of ethane (Matheson Gas, CP grade)=10 ml/min @ STP, reaction pressure=2 Torr, power=50 watts (continuous mode) (Tegal Corp., RF Generator, Model 300P and impedance matching system, Richmond, Calif.). After 8 hours the reaction was stopped giving a slightly yellow film ~6 μm thick. The sample was stored under 15 Torr of ethylene for 15 hours before exposing it to the air. The infrared spectrum showed a 5% transmission loss at 10.0 μm since this thickness is close to a half-wave. A 2 μm thick film which is close to a quarter-wave prepared under similar conditions shows a 12% increase in transmission over an uncoated crystal as shown in FIG. 1. The index of refraction of PPE in this case was found to be 1.35±0.1 by measuring the optical thickness in the infrared.

EXAMPLE 2

The germanium window coated with PPE (example 1) was subjected to a standard salt spray test for 24 hours without any visible damage. However, an uncoated sample was also undamaged. The coated window was then placed in a 97-100% relative humidity chamber at 120° F. The uncoated germanium window began to fog and became pitted after 30 days. After 37 days the damage was severe. The coated side side, however, was not damaged after eleven months of storage.

EXAMPLE 3

Figure 4:
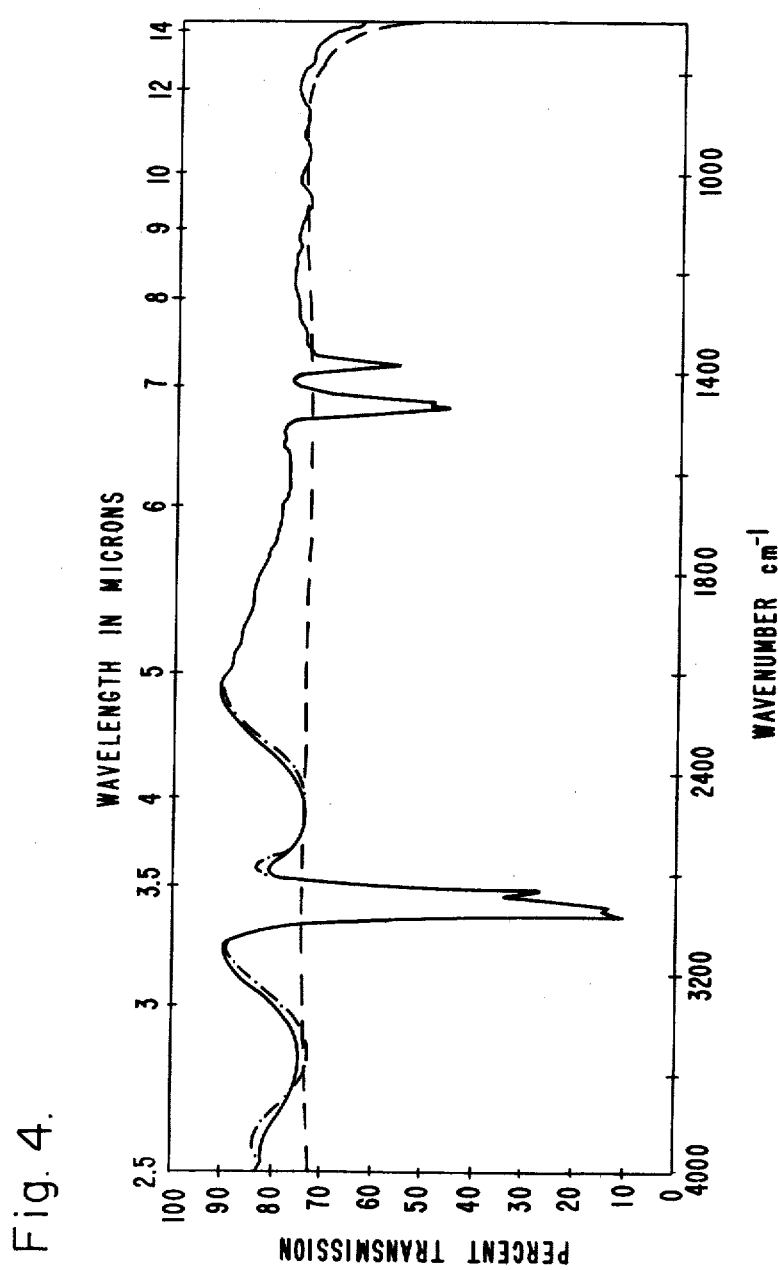
FIG. 4 is a light transmission spectrum of PPE coated and uncoated zinc sulfide.

Plasma polymerized ethane was deposited on a polished piece of polycrystalline zinc sulfide (Kodak, IRTRAN-2, 1 cm$^2$) under the same reaction conditions used in Example 1. After 3.5 hours the reaction was stopped and the sample was stored under 15 Torr of ethylene for 15 hours. This process gave a slightly yellow film ~3.8 μm thick. The IR spectrum of this coated optical component is shown in FIG. 4. The anti-reflective property of the coating can be maximized for a desired wavelength region by using the appropriate film thickness.

EXAMPLE 4

The zinc sulfide window coated with PPE (Example 3) was subjected to 98% RH at 20° for 25 hours with no change in the IR spectrum (see FIG. 4). It was then exposed to 97-100% RH at 120° F. for 8 months at which time the testing was arbitrarily stopped. The center portion of the coated window was undamaged although there was some indication of peeling around the edges.

EXAMPLE 5

A 7.7 μm thick film of PPE was deposited on a portion of a 1 cm$^2$ piece of polycrystalline zinc sulfide by the process shown in Example 1. A portion of the uncoated substrate was masked with a pair of forceps and the entire piece was exposed for 1 minute to fine-grain sandblasting at 65 PSI pressure with the nozzle perpendicular to the surface at a distance of 8 inches. The PPE film showed excellent resistance to abrasion caused by sandblasting as shown in FIG. 3.

INDUSTRIAL APPLICABILITY

Plasma polymerized coatings of saturated hydrocarbons applied to transparent IR materials in accordance with this invention yield environmentally protected optical components which are suitable for use in infrared detection systems that are exposed to military and space environments. The used of these materials will appreciably reduced the cost of infrared detection systems by eliminating the necessity for replacing optical elements at a high frequency. Laser windows and other optical elements may be treated in accordance with this invention to provide protection from moisture, corrosion and physical abrasion.

Having disclosed my invention and provided teachings which enable others to make and utilize my invention, the scope of my claims may now be understood as follows.

I claim:

1. An environmentally protected optical element for use in infrared detection systems comprising a transparent substrate having polished optical surfaces coated with a plasma polymerized saturated short chain hydrocarbon film which increases transmission in the 8 to 12 μm region while providing protection against corrosion and abrasion of said optical surfaces.

2. An optical element of claim 1 wherein said substrate is selected from the group consisting of germanium, zinc sulfide, zinc selenide, and silicon.

3. An optical element of claim 1 wherein said hydrocarbon is selected from the group whose formula is $C_nH_{2n+2}$ where n ranges from 1 to 5.

4. An element of claim 3 wherein said substrate is germanium.

5. An element of claim 4 wherein said hydrocarbon is ethane.

6. An element of claim 3 wherein said substrate is zinc sulfide.

7. An environmentally protected infrared window comprising a substrate selected from the group consisting of germanium, zinc sulfide, silicon, and zinc selenide having surfaces coated with a thin plasma polymerized saturated short chain hydrocarbon film.

8. An infrared window of claim 7 wherein said film is selected from the group consisting of methane, ethane, propane, butane and pentane as the monomer.

9. An infrared window of claim 8 wherein said substrate is germanium.

10. An infrared window of claim 8 wherein said substrate is zinc sulfide.

11. An infrared window of claim 8 wherein said substrate is germanium and said film is ethane.

12. An infrared window of claim 8 wherein said substrate is zinc sulfide and said film is ethane.

13. A method of providing a protective barrier for the surfaces of optical elements utilized in infrared detection systems comprising:
  (a) placing said element in an RF discharge reactor adapted for controllably receiving a gaseous reactant;
  (b) operating said reactor at 50-200 watts as gaseous alkane monomers are passed through said reactor thereby causing said monomers to polymerize whereby thin films are formed which deposit onto the surfaces of said elements to provide a transparent protective coating which prevents corrosion and abrasion; and
  (c) subsequently passing a gaseous alkene through said reactor whereby free radicals, formed from the reaction of said monomers with said plasma, are quenched prior to exposure of said film coated elements to ambient environments.

14. The method of claim 13 wherein said element is an IR window comprised of germanium and said alkane monomer is selected from the group consisting of methane, ethane, propane, butane and pentane.

15. The method of claim 14 wherein said element is an IR window comprised of zinc sulfide and said alkane monomer is selected from the group consisting of methane, ethane, propane, butane and pentane.

16. The method of claim 15 wherein said monomer is ethane.

17. The method of claim 13 wherein said monomer is ethane.

18. A process for increasing the transmissivity of radiation through a selected transparent substrate having polished optical surfaces while simultaneously protecting said substrate from erosion and abrasion, which comprises depositing a plasma polymerized alkane film of a predetermined thickness on one or more of said surfaces.

19. The process defined in claim 18 wherein said transparent substrate is selected from the group consisting of germanium, zinc sulfide, zinc selenide, silver and silicon and wherein said film is selected from the group consisting of methane, ethane, propane, butane and pentane.

20. The process defined in claim 19 wherein said substrate is germanium and said film is ethane.

21. The process defined in claim 19 wherein said substrate in zinc sulfide and said film is ethane.

22. A process for coating optical surfaces of a selected transparent substrate to increase the transmissivity of radiation passing therethrough while simultaneously protecting said substrate from the degradation caused by erosion and corrosion comprising:
  (a) exposing said substrate to the polymerization of a gaseous alkane monomer to form a polymerized alkane;
  (b) depositing said polymerized alkane on one or more of said optical surfaces of said substrate and to a predetermined thickness; and
  (c) quenching free radicals which may remain on said substrate prior to exposure of said substrate to ambient environments.

23. The process defined in claim 22 wherein said substrate is selected from the group consisting of germanium, zinc sulfide, zinc selenide, silver, and silicon and wherein said alkane is selected from the group consisting of methane, ethane, propane, butane and pentane.

* * * * *